United States Patent Office.

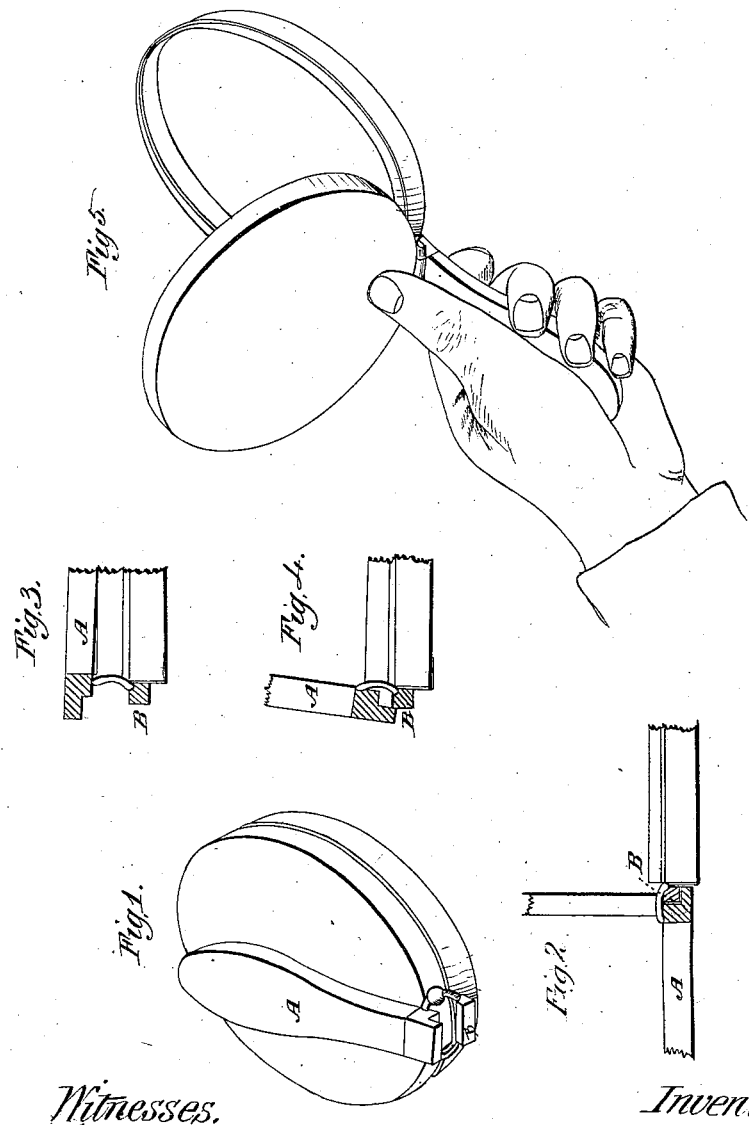

THOMAS H. SPENCER, OF PROVIDENCE, RHODE ISLAND, ASSIGNOR TO CHARLES L. SPENCER, OF SAME PLACE.

*Letters Patent No. 77,778, dated May 12, 1868.*

IMPROVEMENT IN THE CONSTRUCTION OF BLACKING-BOXES.

*The Schedule referred to in these Letters Patent and making part of the same.*

TO ALL WHOM IT MAY CONCERN:

Be it known that I, THOMAS H. SPENCER, of the city and county of Providence, in the State of Rhode Island, have invented a new and useful Improvement on Blacking-Boxes; and I do hereby declare that the following is a full, clear, and exact description of the same, reference being had to the annexed drawings, making a part of this specification, in which—

Figure 1 is a perspective view of my invention, as represented when closed.

Figures 2, 3, and 4 are sectional views.

Figure 5 is a perspective view of my invention, as represented when open.

In the accompanying drawings, A, fig. 1, is a piece of wood, or some suitable substance, forming a handle, one end of which is attached to a blacking-box cover by means of a hinge. One part of this hinge, or the end of handle A, is made a suitable length to extend beyond the edge of the cover, at which it is fastened, and the end is provided with a notch, fig. 3.

B, fig. 1, is a projection on a hinge, which hinge is soldered or fastened to a blacking-box and cover, forming a double hinge, in connection with the hinge on handle A, and bringing projection B in position to match the notch on handle A, when the handle is extended or opened, as shown in fig. 2.

To use my invention, the handle A is raised from the cover, so the notch comes in contact with projection B, which handle serves as a lever to open the cover, as represented on fig. 4. The handle is then opened, or brought parallel with the bottom of the box, the same time opening or raising the cover in a position which will prevent the blacking from spattering upon the hand, fig. 2. To keep the blacking-box more firm when in use, the thumb is pressed against the cover, fig. 5, which holds the projection B in notch on handle A, preventing the box from closing or dropping when turned bottom side up.

The advantage is, the handle can be closed, making it more compact.

I do not claim the blacking-box as my invention; but

What I do claim, and wish to secure by Letters Patent of the United States, is—

A double hinge, when applied to a blacking-box and cover, in connection with a handle, substantially as described, and for the purpose set forth.

THOMAS H. SPENCER.

Witnesses:
JOHN D. THURSTON,
CHARLES L. SPENCER.